US012786002B2

(12) United States Patent
Fujimoto

(10) Patent No.: US 12,786,002 B2
(45) Date of Patent: Nov. 3, 2026

(54) COMMUNICATION SYSTEM

(71) Applicant: SUBARU CORPORATION, Tokyo (JP)

(72) Inventor: Daiya Fujimoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 61 days.

(21) Appl. No.: 18/914,345

(22) Filed: Oct. 14, 2024

(65) Prior Publication Data

US 2025/0132948 A1 Apr. 24, 2025

(30) Foreign Application Priority Data

Oct. 23, 2023 (JP) ................................ 2023-181947

(51) Int. Cl.
*H04L 12/40* (2006.01)

(52) U.S. Cl.
CPC .................. *H04L 12/40006* (2013.01); *H04L 2012/40273* (2013.01)

(58) Field of Classification Search
CPC ................ H04L 12/40006; H04L 2012/40273
See application file for complete search history.

(56) References Cited

U.S. PATENT DOCUMENTS

2020/0314031 A1* 10/2020 Kaku .................. H04L 49/3009
2022/0286321 A1* 9/2022 Yamada ............ H04L 12/40169

FOREIGN PATENT DOCUMENTS

JP 2020-167573 A 10/2020
JP 2023173734 A * 12/2023

OTHER PUBLICATIONS

O. Ibriaeva, V. Shepelev, A. Zhulev, M. Chizhova, G. Yakupova and L. Fatikhova, "The Use of the YOLO Neural Network in the Task of Separating Vehicles and Pedestrians at a Signal-Controlled Intersection," 2020 Global Smart Industry Conference (GloSIC), Chelyabinsk, Russia, 2020, pp. 303-308. (Year: 2020).*

(Continued)

*Primary Examiner* — Messeret F Gebre
(74) *Attorney, Agent, or Firm* — TROUTMAN PEPPER LOCKE LLP

(57) ABSTRACT

A communication system includes a communication device communicably to a vehicle, target units including a first target unit and a second target unit, and an intermediate unit that mediates communication between the communication device and the target units. The intermediate unit includes one or more intermediate unit processors and one or more intermediate unit memories coupled to the one or more intermediate unit processors. The one or more intermediate unit processors performs a process including: when first predetermined information is received from the first target unit, transmitting the first predetermined information to the communication device; and, when second predetermined information is received from the second target unit, generating third predetermined information by converting a value of a predetermined position in predetermined bytes of the second predetermined information received from the second target unit into a preset specific value, and transmitting the generated third predetermined information to the communication device.

10 Claims, 6 Drawing Sheets

(56) References Cited

OTHER PUBLICATIONS

H. Suda, M. Natsui and T. Hanyu, "Systematic Intrusion Detection Technique for an In-vehicle Network Based on Time-Series Feature Extraction," 2018 IEEE 48th International Symposium on Multiple-Valued Logic (ISMVL), Linz, Austria, 2018, pp. 56-61 (Year: 2018).*

* cited by examiner

FIG. 2

| TARGET UNIT TYPE | ID | DISCRIMINATION BIT |
|---|---|---|
| ECU-A | 01 | 1 (EFFECTIVE DATA LENGTH = 3 BYTES) |
| ECU-B | 02 | 1 (EFFECTIVE DATA LENGTH = 3 BYTES) |
| ECU-C | 03 | 0 (EFFECTIVE DATA LENGTH = 2 BYTES) |
| ECU-D | 04 | 0 (EFFECTIVE DATA LENGTH = 2 BYTES) |
| ECU-E | 05 | 0 (EFFECTIVE DATA LENGTH = 2 BYTES) |
| ⋮ | ⋮ | ⋮ |

COMMUNICATION SYSTEM

CROSS-REFERENCE TO RELATED APPLICATION

The present application claims priority from Japanese Patent Application No. 2023-181947 filed on Oct. 23, 2023, the entire contents of which are hereby incorporated by reference.

BACKGROUND

The disclosure relates to a communication system.

Japanese Unexamined Patent Application Publication No. 2020-167573 discloses a technology in which an external device is coupled to a vehicle and diagnoses malfunctions in various electronic devices of the vehicle.

SUMMARY

An aspect of the disclosure provides a communication system including a communication device, target units, and an intermediate unit. The communication device is communicably to a vehicle. The target units are provided to the vehicle and include a first target unit and a second target unit. In the first target unit, an effective data length is predetermined bytes. In the second target unit, the effective data length is smaller than the predetermined bytes. The intermediate unit is provided to the vehicle and configured to mediate communication between the communication device and each of the target units. The intermediate unit includes one or more intermediate unit processors and one or more intermediate unit memories. The one or more intermediate unit memories are coupled to the one or more intermediate unit processors. The one or more intermediate unit processors are configured to perform a process including, when first predetermined information is received from the first target unit, transmitting the first predetermined information to the communication device. The one or more intermediate unit processors are configured to perform a process including, when second predetermined information is received from the second target unit, generating third predetermined information by converting a value of a predetermined position in the predetermined bytes of the second predetermined information received from the second target unit into a preset specific value, and transmitting the generated third predetermined information to the communication device.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 2 illustrates a setting file according to the embodiment of the disclosure;

DETAILED DESCRIPTION

When diagnosis is made on malfunctions in various electronic devices of a vehicle, the various electronic devices of the vehicle transmit messages including error code information etc. to an external device. Based on the messages received from the various electronic devices of the vehicle, the external device can display the error code information etc. and diagnose malfunctions.

The messages have different effective data lengths depending on design specifications of the various electronic devices of the vehicle. If the external device cannot accurately determine the effective data length of each received message, the displayed error code may be wrong and malfunction diagnosis cannot be performed properly. Thus, the user's convenience may decrease.

It is desirable to suppress the decrease in the user's convenience.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
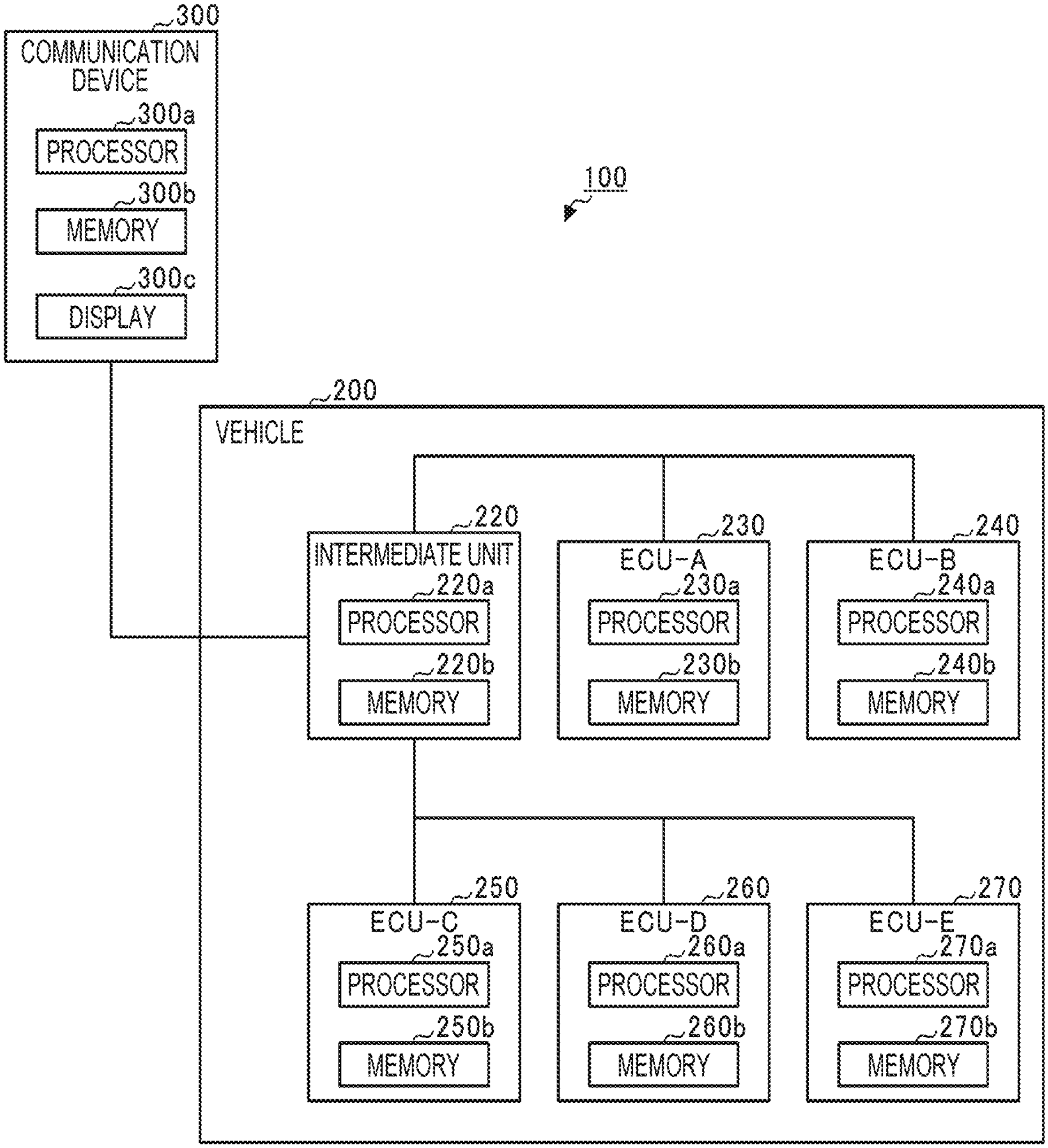
FIG. 1 is a functional block diagram illustrating a communication system according to an embodiment of the disclosure.

FIG. 1 is a functional block diagram illustrating a communication system 100 according to this embodiment. As illustrated in FIG. 1, the communication system 100 includes a vehicle 200 and a communication device 300 coupled to the vehicle 200. Examples of the vehicle 200 include a hybrid vehicle including an engine and a motor as traveling drive sources.

The vehicle 200 includes an intermediate unit 220, an ECU-A 230, an ECU-B 240, an ECU-C 250, an ECU-D 260, and an ECU-E 270.

The communication device 300 is a dedicated terminal such as a malfunction diagnosis terminal that diagnoses a malfunction in the vehicle 200. Examples of the communication device 300 include a personal computer. The communication device 300 is coupled to the vehicle 200 to communicate bidirectionally with the ECU-A 230, the ECU-B 240, the ECU-C 250, the ECU-D 260, and the ECU-E 270 via the intermediate unit 220. Communications among the communication device 300, the intermediate unit 220, the ECU-A 230, the ECU-B 240, the ECU-C 250, the ECU-D 260, and the ECU-E 270 may be performed using, for example, a controller area network (CAN) protocol. In this embodiment, the communication device 300 is coupled to the vehicle 200 by wire, but may be coupled by wireless.

The ECU-A 230, the ECU-B 240, the ECU-C 250, the ECU-D 260, and the ECU-E 270 are referred to collectively as "target units." The target units may be control units for various electronic devices mounted on the vehicle 200. Examples of the target units include an engine controller that controls the engine. Examples of the target units include a motor controller that controls the motor. Examples of the target units include a battery controller that controls a battery. Examples of the target units include a wireless communicator that wirelessly communicates with a data center outside the vehicle 200. Examples of the target units include a car navigation system controller that controls a car navigation system. Examples of the target units include an autonomous driving controller that controls autonomous driving of the vehicle 200.

The ECU-A 230 and the ECU-B 240 are also referred to collectively as "first target units." In this embodiment, two first target units that are the ECU-A 230 and the ECU-B 240 are provided, but the number of first target units is not limited thereto, and one or more first target units may be provided.

The ECU-C 250, the ECU-D 260, and the ECU-E 270 are also referred to collectively as "second target units." In this embodiment, three second target units that are the ECU-C 250, the ECU-D 260, and the ECU-E 270 are provided, but the number of second target units is not limited thereto, and one or more second target units may be provided.

Although details will be described later, the first target units and the second target units in this embodiment can generate messages each having a data length of 3 bytes and transmit them to the communication device 300 via the intermediate unit 220. The first target unit can generate a message having an effective data length of 3 bytes and transmit it to the communication device 300 via the intermediate unit 220. The second target unit can generate a message having an effective data length of 2 bytes and transmit it to the communication device 300 via the intermediate unit 220. That is, the first target unit and the second target unit are different in terms of the effective data length of the message. In this embodiment, the data length of the message is 3 bytes, but may be 3 bytes or more, or may be a variable data length.

In this embodiment, the first target unit and the second target unit are different in that the effective data length of the generated message is 2 bytes for the second target unit and 3 bytes for the first target unit, but this case is not limitative as long as the effective data length of the message generated by the second target unit is smaller than the effective data length of the message generated by the first target unit.

In this embodiment, the data length of the message may be equal to the effective data length of the message and may be unequal to the effective data length of the message. In this embodiment, the effective data length is the length of message data to be determined as being effective when measured from a predetermined position. For example, the effective data length in this embodiment is the length of message data from the first to n-th bytes to be determined as being effective when measured from the head. When the effective data length of the message is 3 bytes, the length of message data from the first to third bytes when measured from the head is determined as being effective. When the effective data length of the message is 2 bytes, the length of message data of the first and second bytes when measured from the head is determined as being effective.

The intermediate unit 220 has a function of relaying communication between the communication device 300 and the target unit. The intermediate unit 220 has a function of converting part of the message received from the target unit and transmitting it to the communication device 300.

As illustrated in FIG. 1, the ECU-A 230 includes one or more processors 230*a* and one or more memories 230*b* coupled to the processors 230*a*. The ECU-B 240 includes one or more processors 240*a* and one or more memories 240*b* coupled to the processors 240*a*. The ECU-C 250 includes one or more processors 250*a* and one or more memories 250*b* coupled to the processors 250*a*. The ECU-D 260 includes one or more processors 260*a* and one or more memories 260*b* coupled to the processors 260*a*. The ECU-E 270 includes one or more processors 270*a* and one or more memories 270*b* coupled to the processors 270*a*.

Each of the processor 230*a*, the processor 240*a*, the processor 250*a*, the processor 260*a*, and the processor 270*a* includes, for example, a central processing unit (CPU). Each of the memory 230*b*, the memory 240*b*, the memory 250*b*, the memory 260*b*, and the memory 270*b* includes, for example, a read only memory (ROM) and a random access memory (RAM). The ROM is a storage element that stores programs and arithmetic parameters to be used by the CPU. The RAM is a storage element that temporarily stores data such as variables and parameters to be used for processes performed by the CPU.

In this embodiment, each of the memory 230*b*, the memory 240*b*, the memory 250*b*, the memory 260*b*, and the memory 270*b* stores an ID for identifying the target unit, and information for identifying the effective data length of a message to be generated by the target unit. In this embodiment, a discrimination bit is stored as the information for identifying the effective data length of a message to be generated by the target unit.

When the value of the discrimination bit is "0," the effective data length of a message to be generated by the target unit is 2 bytes. That is, each of the memory 230*b* of the ECU-A 230 and the memory 240*b* of the ECU-B 240 stores a value "1" as the discrimination bit.

When the value of the discrimination bit is "1," the effective data length of a message to be generated by the target unit is 3 bytes. That is, each of the memory 250*b* of the ECU-C 250, the memory 260*b* of the ECU-D 260, and the memory 270*b* of the ECU-E 270 stores a value "0" as the discrimination bit.

Each of the memory 230*b*, the memory 240*b*, the memory 250*b*, the memory 260*b*, and the memory 270*b* stores information indicating records of codes of malfunctions in each target unit.

As illustrated in FIG. 1, the intermediate unit 220 includes one or more processors 220*a* and one or more memories 220*b* coupled to the processors 220*a*. The processor 220*a* includes, for example, a CPU. The memory 220*b* includes, for example, a ROM and a RAM. The ROM is a storage element that stores programs and arithmetic parameters to be used by the CPU. The RAM is a storage element that temporarily stores data such as variables and parameters to be used for processes performed by the CPU.

In this embodiment, the memory 220*b* stores a setting file. FIG. 2 illustrates the setting file according to the embodiment of the disclosure. As illustrated in FIG. 2, the setting file stores the ID and the discrimination bit for each type of target unit.

Although details will be described later, when a message is received from the target unit, the intermediate unit 220 switches processes to be performed on the received message based on the value of the discrimination bit of the target unit.

The intermediate unit 220 may construct and update the setting file based on the value of the discrimination bit stored in the memory of the target unit. For example, the intermediate unit 220 may construct and update the setting file based on the value of the discrimination bit stored in the memory of each target unit mounted on the vehicle 200 when a predetermined timing such as an engine start timing has come.

As illustrated in FIG. 1, the communication device 300 includes one or more processors 300*a* and one or more memories 300*b* coupled to the processors 300*a*. The processor 300*a* includes, for example, a CPU. The memory 300*b* includes, for example, a ROM and a RAM. The communication device 300 includes a display 300*c* that performs predetermined display based on various messages received from the target units. Examples of the display 300*c* include a liquid crystal display and an organic electroluminescence (EL) display.

As described above, the message generated by the target unit in this embodiment has a length of 3 bytes irrespective of the effective data length of the message. For example, in a case of FIG. 3 described later, a significant value "00" is set as the third byte of a message generated by the ECU-A 230. In a case of FIG. 4 described later, an insignificant value "00" is set as the third byte of a message generated by the ECU-C 250. If the communication device 300 cannot discriminate the effective data length of the received message, the error code displayed on the display 300*c* may be wrong and malfunction diagnosis cannot be performed properly. Thus, the user's convenience may decrease. In this embodiment, the communication device 300 accurately determines the effective data length of the received message to reduce the possibility that the error code displayed on the display 300*c* is wrong and malfunction diagnosis cannot be performed properly. Thus, the user's convenience can be improved.

Figure 3:
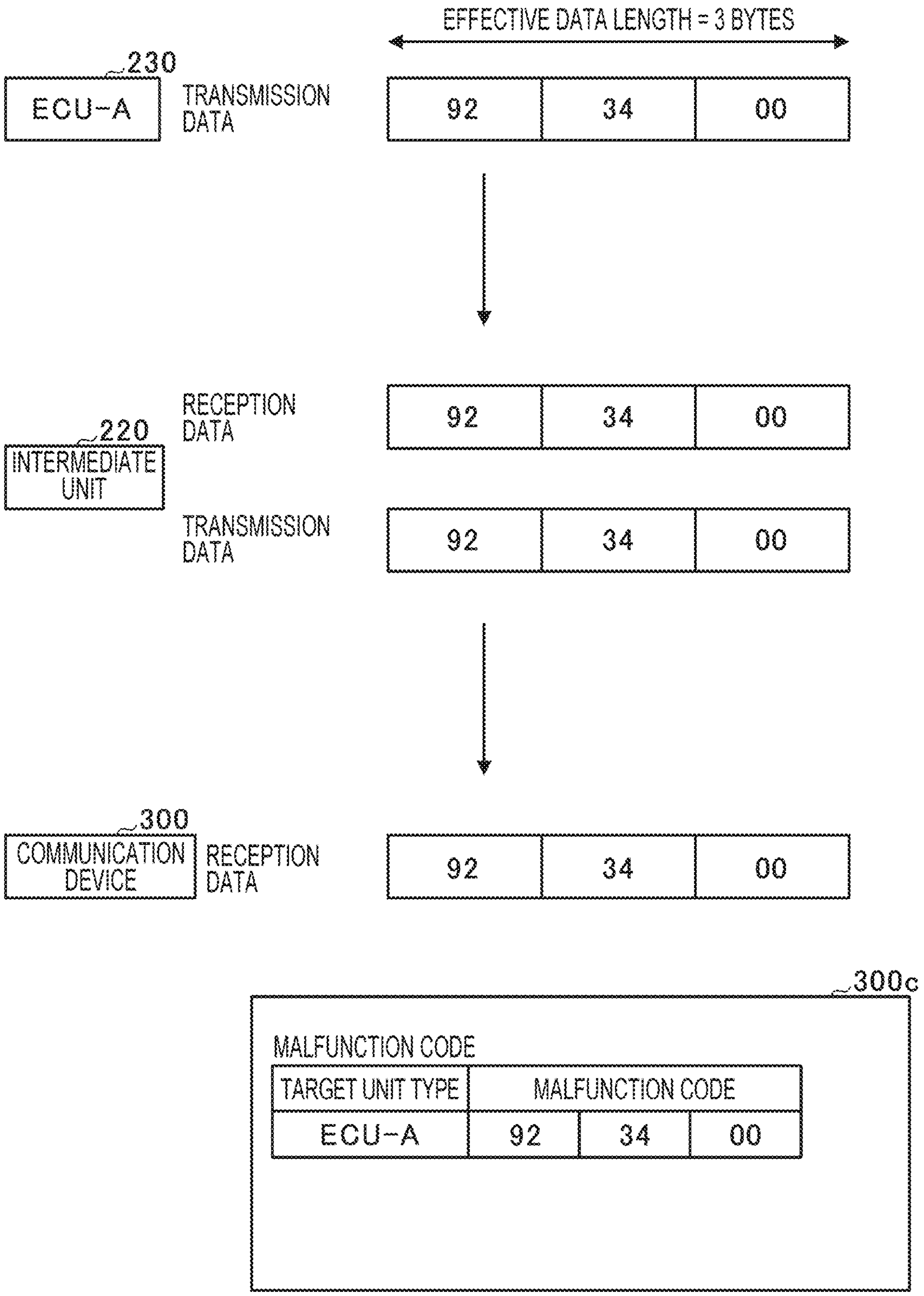
FIG. 3 illustrates a process related to a case where a first target unit transmits a message according to the embodiment of the disclosure.

FIG. 3 illustrates a process related to a case where the first target unit transmits a message according to the embodiment of the disclosure. As an example of the first target unit, the ECU-A 230 transmits a message to the communication device 300 via the intermediate unit 220.

When an information request command for requesting transmission of information indicating a record of a malfunction code is received from the communication device 300, the ECU-A 230 generates a three-byte message including the record of the malfunction code based on the contents stored in the memory 230*b*. This message includes information indicating a record of a three-byte malfunction code. In the information indicating the record of the malfunction code, the effective data length is set to 3 bytes. Header information indicating an ID of the transmission-source target unit may be added to the three-byte message. For example, one-byte header information and the three-byte message are generated and transmitted to the communication device 300 via the intermediate unit 220.

The ECU-A 230 transmits the generated message to the intermediate unit 220. When the message is received from the ECU-A 230, the intermediate unit 220 checks the discrimination bit of the ECU-A 230 by referring to the setting file. That is, the intermediate unit 220 checks the effective data length of the message based on the target unit that has transmitted the message. In this embodiment, a value "1" is set as the discrimination bit of the ECU-A 230, and therefore the intermediate unit 220 recognizes that the effective data length of the message received from the ECU-A 230 is 3 bytes.

The intermediate unit 220 transmits the received message to the communication device 300 without changing the content of the message.

The communication device 300 checks the value of the third byte of the message received from the intermediate unit 220. The communication device 300 determines whether a specific value is set as the value of the third byte of the message. In this embodiment, a specific value "FF" is used, but the specific value is not limited thereto. In the case of FIG. 3, a value "00" is set as the third byte of the message. Thus, the communication device 300 determines that the specific value is not set as the third byte of the message and an effective value is set as the third byte of the message. The communication device 300 causes the display 300*c* to display the received three-byte malfunction code.

Figure 4:
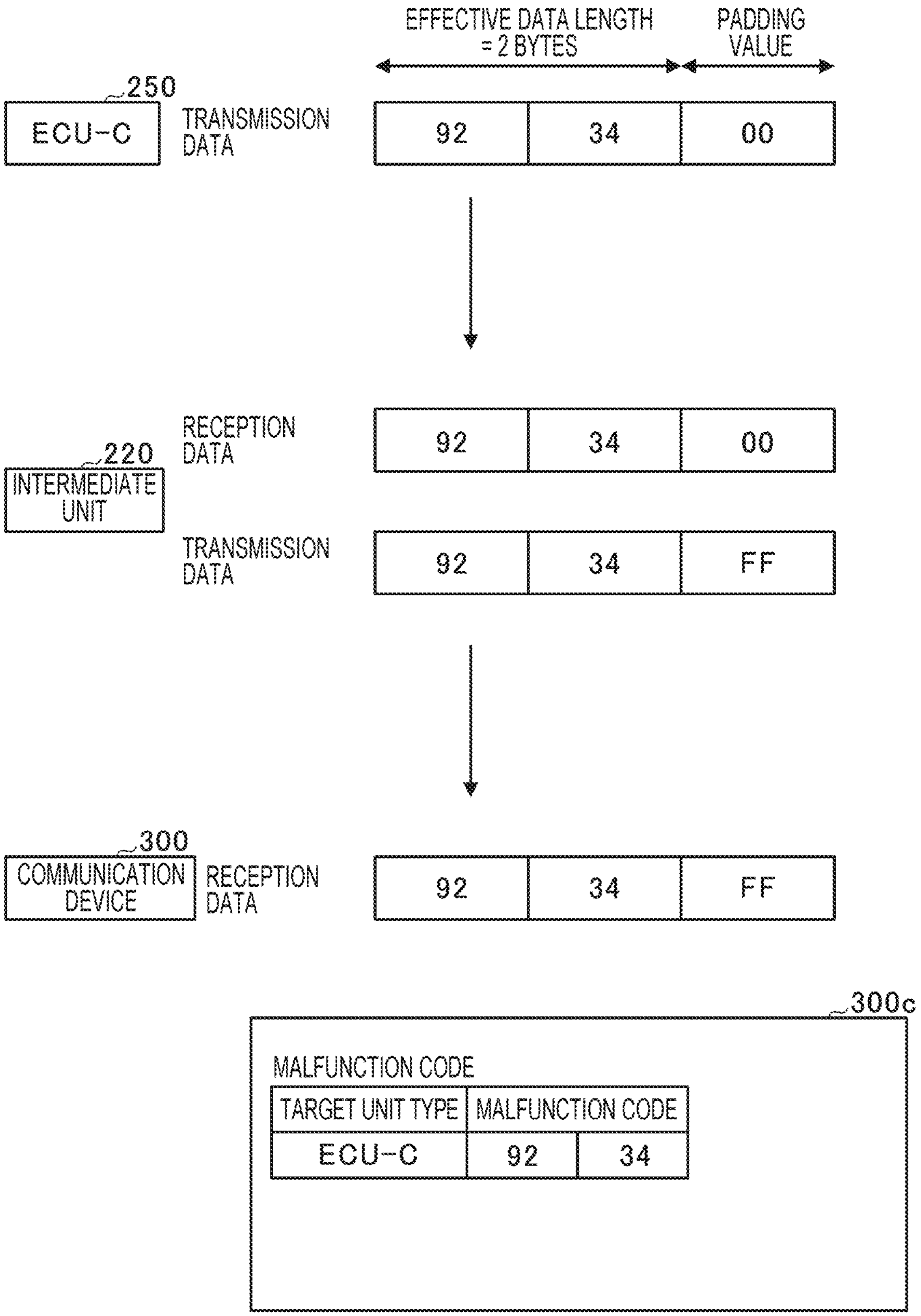
FIG. 4 illustrates a process related to a case where a second target unit transmits a message according to the embodiment of the disclosure.

FIG. 4 illustrates a process related to a case where the second target unit transmits a message according to the embodiment of the disclosure. As an example of the second target unit, the ECU-C 250 transmits a message to the communication device 300 via the intermediate unit 220.

When an information request command for requesting transmission of information indicating a record of a malfunction code is received from the communication device 300, the ECU-C 250 generates a message including the record of the malfunction code based on the contents stored in the memory 250*b*. As described above, the effective data length of the message generated by the ECU-C 250 that is the second target unit is 2 bytes. As illustrated in FIG. 4, the ECU-C 250 sets the value of the information indicating the record of the malfunction code as the higher 2 bytes, and sets an insignificant padding value "00" as the lower 1 byte, that is, the third byte.

The ECU-C 250 transmits the generated message to the intermediate unit 220. When the message is received from the ECU-C 250, the intermediate unit 220 checks the discrimination bit of the ECU-C 250 by referring to the setting file. That is, the intermediate unit 220 checks the effective data length settable by the target unit that has transmitted the message. In this embodiment, a value "0" is set as the discrimination bit of the ECU-C 250, and therefore the intermediate unit 220 recognizes that the effective data length of the message received from the ECU-C 250 is 2 bytes.

The intermediate unit 220 performs a message generation process for generating a message by converting the value of the third byte of the received message into "FF." The intermediate unit 220 transmits, to the communication device 300, the message generated by converting the value of the third byte into "FF" through the message generation process.

The communication device 300 checks the value of the third byte of the message received from the intermediate unit 220. The communication device 300 determines whether the specific value is set as the value of the third byte of the message. In the case of FIG. 4, the value "FF" is set as the third byte of the message. Thus, the communication device 300 determines that the specific value, that is, the insignificant value, is set as the third byte of the message. The communication device 300 causes the display 300*c* to display the values of the higher 2 bytes in the received message as the malfunction code.

As described above, when the message is received from the second target unit, the intermediate unit 220 converts the value of the third byte of the received message into the specific value, and transmits the message including the specific value as the third byte to the communication device 300. When the value of the third byte of the received message is "FF," the communication device 300 can determine that the effective data length is 2 bytes. When the value of the third byte of the received message is a value other than "FF," the communication device 300 can determine that the effective data length is 3 bytes.

Therefore, the communication device 300 can accurately determine the effective data length of the received message by referring to the value of the third byte of the received message. Thus, it is possible to reduce the possibility that the communication device 300 erroneously recognizes insignificant data (e.g., padding value) in the received message as significant data. It is possible to reduce the possibility that the user's convenience decreases because the error code displayed on the display 300*c* of the communication device 300 is wrong and malfunction diagnosis cannot be performed properly.

According to this embodiment, the communication device 300 can omit a database etc. to be used for checking the effective data length of the message. Therefore, the communication device 300 can accurately determine the effective data length by checking the predetermined position in the predetermined bytes of the received message without greatly changing the design of the communication device 300. Thus, it is possible to reduce the possibility that the design cost increases. The processes to be performed by the communication system 100 are described below.

Figure 5:
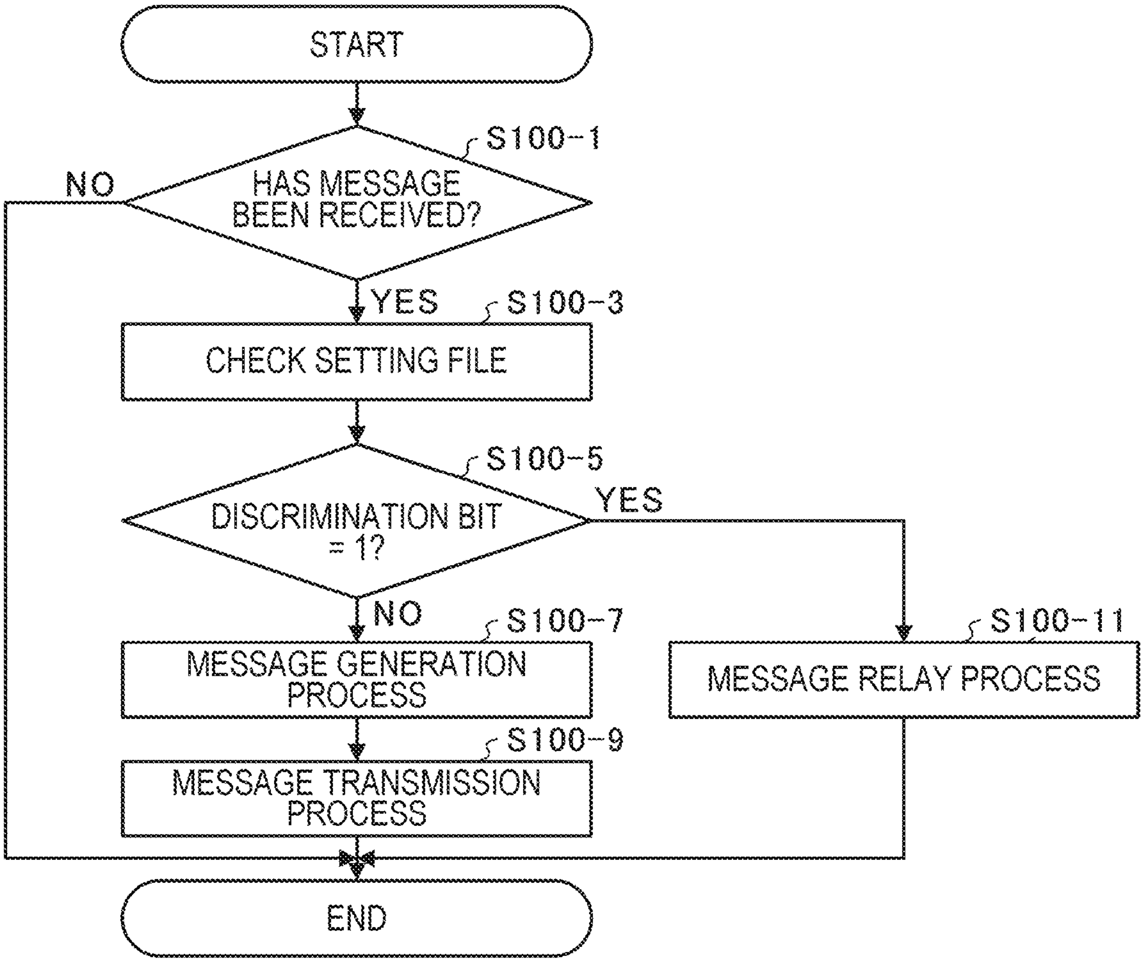
FIG. 5 is a flowchart illustrating an intermediate unit process according to the embodiment of the disclosure.

An intermediate unit process to be performed by the intermediate unit 220 is described. FIG. 5 is a flowchart illustrating the intermediate unit process according to the embodiment of the disclosure. Various processes including the process described below can be performed by the processor 220*a* of the intermediate unit 220. For example, the processor 220*a* executes a program stored in the memory 220*b* of the intermediate unit 220 to perform the various processes. For example, the intermediate unit process is performed when the target unit transmits a message to the communication device 300 via the intermediate unit 220. The intermediate unit process is repeatedly performed.

As illustrated in FIG. 5, the intermediate unit 220 determines whether the message is received from the target unit (S100-1). When no message is received from the target unit (NO in S100-1), the intermediate unit 220 terminates the intermediate unit process.

When the message is received from the target unit (YES in S100-1), the intermediate unit 220 checks the setting file stored in the memory 220*b*. For example, the intermediate unit 220 checks the value of the discrimination bit associated with the target unit that has transmitted the message. When the target unit that has transmitted the message is, for example, the ECU-A 230, the intermediate unit 220 checks whether the value of the discrimination bit is "1" by referring to the setting file. When the target unit that has transmitted the message is the ECU-C 250, the intermediate unit 220 checks whether the value of the discrimination bit is "0" by referring to the setting file.

Based on the result of the check in Step S100-3, the intermediate unit 220 determines whether the value of the discrimination bit is "1" (S100-5). When the value of the discrimination bit is not "1" (NO in S100-5), that is, the value of the discrimination bit is "0," the intermediate unit 220 advances the process to Step S100-7. When the value of the discrimination bit is "1" (YES in S100-5), the intermediate unit 220 advances the process to Step S100-11.

The intermediate unit 220 performs the message generation process for generating a message by converting the value of the third byte of the received message into the specific value (S100-7). The intermediate unit 220 performs a message transmission process for transmitting, to the communication device 300, the message generated by converting the value of the third byte into the specific value in Step S100-7 (S100-9), and terminates the intermediate unit process.

The intermediate unit 220 performs a message relay process for transmitting the received message to the communication device 300 without changing the content of the message (S100-11), and terminates the intermediate unit process.

Figure 6:
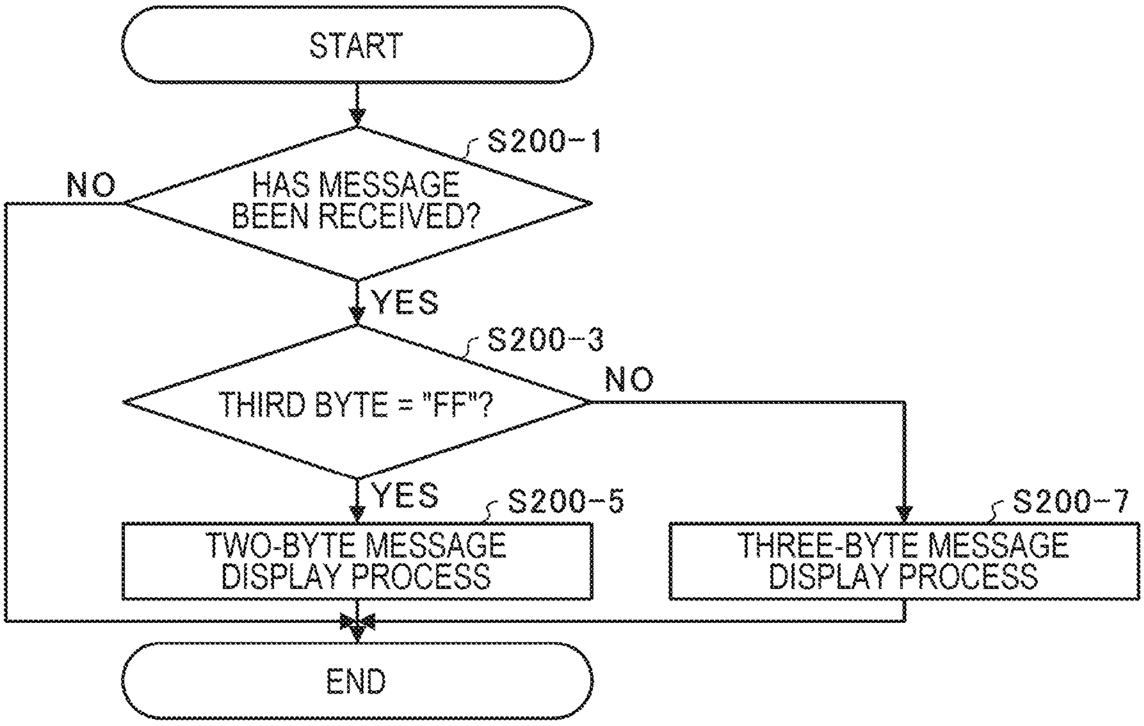
FIG. 6 is a flowchart illustrating a communication device process according to the embodiment of the disclosure.

A communication device process to be performed by the communication device 300 is described. FIG. 6 is a flowchart illustrating the communication device process according to the embodiment of the disclosure. Various processes including the process described below can be performed by the processor 300*a* of the communication device 300. For example, the processor 300*a* executes a program stored in the memory 300*b* of the communication device 300 to perform the various processes. For example, the communication device process is performed when the target unit transmits a message to the communication device 300 via the intermediate unit 220.

As illustrated in FIG. 6, the communication device 300 determines whether the message is received from the target unit via the intermediate unit 220 (S200-1). When no message is received from the target unit via the intermediate unit 220 (NO in S200-1), the communication device 300 terminates the communication device process.

When the message is received from the target unit via the intermediate unit 220 (YES in S200-1), the communication device 300 determines whether the value of the third byte of the message is "FF" (S200-3).

When the value of the third byte of the message is "FF" (YES in S200-3), the communication device 300 advances the process to Step S200-5. The communication device 300 performs a two-byte message display process for causing the display 300*c* to display the values of the higher 2 bytes in the received message (S200-5), and terminates the communication device process. In the two-byte message display process, the values of the higher 2 bytes in the received message are displayed and the value of the third byte is not displayed.

When the value of the third byte of the message is not "FF" (NO in S200-3), the communication device 300 advances the process to Step S200-7. The communication device 300 performs a three-byte message display process for causing the display 300*c* to display all the values of the first to third bytes in the received message (S200-7), and terminates the communication device process.

As described above, the communication system 100 according to this embodiment includes the communication device 300 couplable to the vehicle 200.

The communication system 100 includes the target units provided to the vehicle 200 and including the first target unit (e.g., ECU-A 230, ECU-B 240) in which the effective data length is the predetermined bytes (e.g., 3 bytes), and the second target unit (e.g., ECU-C 250, ECU-D 260, ECU-E 270) in which the effective data length is smaller than the predetermined bytes (e.g., 2 bytes).

The communication system 100 includes the intermediate unit 220 provided to the vehicle 200 and configured to mediate communication between the communication device 300 and each of the target units (e.g., ECU-A 230, ECU-B 240, ECU-C 250, ECU-D 260, ECU-E 270).

The intermediate unit 220 includes one or more intermediate unit processors (e.g., processor 220*a*) and one or more intermediate unit memories (e.g., memory 220*b*) coupled to the intermediate unit processors (e.g., processor 220*a*).

The intermediate unit processor (e.g., processor 220*a*) is configured to perform the process including, when first predetermined information (e.g., a message in which the first byte is set to "CO," the second byte is set to "14," and the third byte is set to "00") is received from the first target unit (e.g., ECU-A 230), transmitting the first predetermined information to the communication device 300 (e.g., Step S100-11 in the embodiment).

The intermediate unit processor (e.g., processor 220*a*) is configured to perform the process including, when second predetermined information (e.g., a message in which the first byte is set to "92," the second byte is set to "34," and the third byte is set to "00") is received from the second target unit (e.g., ECU-C 250), generating third predetermined information (e.g., a message in which the first byte is set to "92," the second byte is set to "34," and the third byte is set to "FF") by converting the value of the predetermined position (e.g., third byte) in the predetermined bytes of the second predetermined information received from the second target unit into the preset specific value (e.g., "FF"), and transmitting the generated third predetermined information to the communication device 300 (e.g., Steps S100-7, S100-9 in the embodiment).

In the communication system 100 of this embodiment, the communication device 300 can accurately determine the effective data length by checking the predetermined position in the predetermined bytes of the received message. Thus, it is possible to reduce the possibility that the user's convenience decreases because the error code displayed on the display 300*c* is wrong and malfunction diagnosis cannot be performed properly.

The communication device 300 may include one or more communication device processors (e.g., processor 300*a*) and one or more communication device memories (e.g., memory 300*b*) coupled to the communication device processors (e.g., processor 300*a*).

The communication device processor (e.g., processor 300*a*) may be configured to perform the process including, when the first predetermined information (e.g., the message in which the first byte is set to "CO," the second byte is set to "14," and the third byte is set to "00") is received from the target unit (e.g., ECU-A 230) via the intermediate unit 220, performing the predetermined process (e.g., the process of displaying the error code on the display 300*c*) based on the received first predetermined information (e.g., S200-7 in the embodiment).

The communication device processor (e.g., processor 300*a*) may be configured to perform the process including, when the third predetermined information (e.g., the message in which the first byte is set to "92," the second byte is set to "34," and the third byte is set to "FF") having the specific value (e.g., "FF") as the value of the predetermined position (e.g., third byte) in the predetermined bytes is received from the target unit (e.g., ECU-C 250) via the intermediate unit 220, excluding the predetermined position (e.g., third byte) in the predetermined bytes from the target of the predetermined process (e.g., the process of displaying the error code on the display 300*c*) (e.g., S200-5 in the embodiment).

With this configuration, the communication device 300 can accurately determine the effective data length without providing the communication device 300 with a database etc. to be used for checking the effective data length of the message. Therefore, the display 300*c* can accurately display the error code without greatly changing the design of the communication device 300. Thus, it is possible to reduce the possibility that the user's convenience decreases because the error code displayed on the display 300*c* is wrong and malfunction diagnosis cannot be performed properly.

Although the embodiment of the disclosure is described above with reference to the accompanying drawings, the embodiment of the disclosure is not limited to this embodiment. It is understood that various modifications and revisions are conceivable by persons having ordinary skill in the art within the scope of claims and are included in the technical scope disclosed herein.

In the above embodiment, the vehicle 200 is a hybrid vehicle, but may be various types of vehicle such as a gasoline vehicle, an electric vehicle (EV), a plug-in hybrid vehicle (PHEV), and a non-plug-in hybrid vehicle (hybrid vehicle).

The series of processes to be performed by the communication system 100 according to the above embodiment may be implemented using software, hardware, or a combination of software and hardware. Programs serving as software are prestored in, for example, non-transitory media provided inside or outside each device. For example, the programs are written into a non-transitory storage element (e.g., ROM) directly or temporarily from the non-transitory medium, loaded into a transitory storage medium (e.g., RAM), and executed by a processor such as a CPU.

According to the above embodiment, programs for performing the processes of the functions of the communication system 100 can be provided. Further, non-transitory computer-readable media storing the programs can be provided. The non-transitory media may be disc (disk) media such as an optical disc, a magnetic disk, and a magneto-optical disk, or may be semiconductor memories such as a flash memory and a USB memory.

The intermediate unit 220 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the intermediate unit 220. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A communication system comprising: a communication device communicably to a vehicle;

target units provided to the vehicle and comprising a first target unit in which an effective data length is predetermined bytes, and a second target unit in which the effective data length is smaller than the predetermined bytes; and an intermediate unit provided to the vehicle and configured to mediate communication between the communication device and each of the target units, wherein the intermediate unit comprises one or more intermediate unit processors and one or more intermediate unit memories coupled to the one or more intermediate unit processors, and wherein the one or more intermediate unit processors are configured to perform a process comprising:

when first predetermined information is received from the first target unit, transmitting the first predetermined information to the communication device, wherein a message length of the first predetermined information is predetermined bytes; and when second predetermined information is received from the second target unit, generating third predetermined information by converting a value of a predetermined position in the predetermined bytes of the second predetermined information received from the second target unit into a preset specific value, and transmitting the generated third predetermined information to the communication device, and wherein a message length of the second predetermined information is predetermined bytes, and wherein a message length of the third predetermined information is predetermined bytes, wherein the communication device comprises one or more communication device processors and one or more communication device memories coupled to the one or more communication device processors, and wherein the one or more communication device processors are configured to perform a process comprising:

when the first predetermined information is received from the first target unit via the intermediate unit, performing a predetermined process based on the received first predetermined information;

wherein the predetermined process comprises:

determining a malfunction code from the bytes in the predetermined bytes, and when the third predetermined information having the preset specific value as the value of the predetermined position in the predetermined bytes is received from the second target unit via the intermediate unit, excluding the predetermined position in the predetermined bytes from a target of the predetermined process;

wherein excluding the predetermined position in the predetermined bytes from the target of the predetermined process comprises excluding the predetermined position from the bytes used to determine the malfunction code.

2. The communication system according to claim 1, wherein the one or more intermediate unit processors are further configured to determine, based on stored configuration information associating each target unit with its effective data length, whether received information is from the first target unit or the second target unit.

3. A communication system comprising:

a communication device communicably to a vehicle;

a target unit provided to the vehicle, configured to generate a first message, and configured to store predetermined configuration information, wherein a message length of the first message is predetermined bytes, and wherein the configuration information indicates whether an effective data length of the first message is the predetermined bytes; and an intermediate unit provided to the vehicle and configured to mediate communication between the communication device and the target unit, wherein the intermediate unit comprises one or more intermediate unit processors and one or more intermediate unit memories coupled to the one or more intermediate unit processors, and wherein the one or more intermediate unit processors are configured to perform a process comprising:

in response to receiving the configuration information from the target unit, storing the configuration information in the one or more intermediate unit memories in association with the target unit;

in response to receiving the first message from the target unit, determining whether the configuration information stored in association with the target unit indicates that the effective data length of the received first message is the predetermined bytes;

in response to determining that the configuration information stored in association with the target unit indicates that the effective data length of the received first message is the predetermined bytes, transmitting the received first message to the communication device;

in response to determining that the configuration information stored in association with the target unit does not indicate that the effective data length of the received first message is the predetermined bytes, (i) not transmitting the received first message to the communication device, and (ii) generating a second message by rewriting a value of a last byte of the received first message to a preset predetermined value, wherein a message length of the second message is the predetermined bytes; and in response to generation of the second message, transmitting the generated second message to the communication device;

wherein the communication device comprises one or more communication device processors and one or more communication device memories coupled to the one or more communication device processors, and wherein the one or more communication device processors are configured to perform a process comprising:

in response to receiving, from the intermediate unit, a message that is the first message or the second message, determining whether a value of a last byte of the received message is the preset predetermined value; in response to determining that the value of the last byte of the received message is not the preset predetermined value, performing a predetermined process based on information indicated by the entirety of the received message; and in response to determining that the value of the last byte of the received message is the preset predetermined value, performing the predetermined process based on information indicated by a portion of the received message excluding the last byte of the received message.

4. The communication system according to claim 3, wherein the one or more intermediate unit processors are configured to receive the configuration information from the target unit in response to a start of the vehicle.

5. The communication system according to claim 4, wherein the predetermined process comprises determining a malfunction code.

6. The communication system according to claim 3, wherein the predetermined process comprises determining a malfunction code.

7. A communication system comprising:

a communication device communicably to a vehicle;

a target unit provided to the vehicle, configured to generate a first message, and configured to store predetermined configuration information, wherein a message length of the first message is predetermined bytes, and wherein the configuration information indicates an effective data length of the first message; and an intermediate unit provided to the vehicle and configured to mediate communication between the communication device and the target unit, wherein the intermediate unit comprises one or more intermediate unit processors and one or more intermediate unit memories coupled to the one or more intermediate unit processors, wherein the one or more intermediate unit processors are configured to perform a process comprising:

in response to receiving the configuration information from the target unit, storing the configuration information in the one or more intermediate unit memories in association with the target unit;

in response to receiving the first message from the target unit, determining, based on the configuration information stored in association with the target unit, whether the effective data length of the received first message is less than the predetermined bytes;

in response to determining that the effective data length of the received first message is not less than the predetermined bytes, transmitting the received first message to the communication device;

in response to determining that the effective data length of the received first message is less than the predetermined bytes, (i) not transmitting the received first message to the communication device, and (ii) generating a second message by rewriting a predetermined portion of the received first message to a preset predetermined value, wherein the predetermined portion is a part or all of the received first message after the predetermined bytes from a head of the received first message, and wherein a message length of the second message is the predetermined bytes; and in response to generation of the second message, transmitting the generated second message to the communication device, and wherein the communication device comprises one or more communication device processors and one or more communication device memories coupled to the one or more communication device processors, and wherein the one or more communication device processors are configured to perform a process comprising:

in response to receiving, from the intermediate unit, a message that is the first message or the second message, determining whether the predetermined portion of the received message is the preset predetermined value;

in response to determining that the predetermined portion of the received message is not the preset predetermined value, performing a predetermined process based on information indicated by the entirety of the received message; and in response to determining that the predetermined portion of the received message is the preset predetermined value, performing the predetermined process based on information indicated by a portion of the received message from the head of the received message to the predetermined bytes.

8. The communication system according to claim 7, wherein the one or more intermediate unit processors are configured to receive the configuration information from the target unit in response to a start of the vehicle.

9. The communication system according to claim 7, wherein the predetermined process comprises determining a malfunction code.

10. The communication system according to claim 8, wherein the predetermined process comprises determining a malfunction code.

* * * * *